United States Patent [19]
Mankovitz

[11] Patent Number: 5,633,918
[45] Date of Patent: May 27, 1997

[54] INFORMATION DISTRIBUTION SYSTEM

[76] Inventor: Roy J. Mankovitz, 18057 Medley Dr., Encino, Calif. 91316

[21] Appl. No.: 591,523

[22] PCT Filed: Aug. 3, 1994

[86] PCT No.: PCT/US94/08748

§ 371 Date: Feb. 2, 1996

§ 102(e) Date: Feb. 2, 1996

[87] PCT Pub. No.: WO95/04426

PCT Pub. Date: Feb. 9, 1995

[51] Int. Cl.$^6$ .................................................. H04M 11/00
[52] U.S. Cl. .................. 379/97; 379/90; 379/110
[58] Field of Search .................. 379/100, 93, 96–99, 379/90, 110, 212–214, 354–357; 358/400, 402, 403, 407, 434–436, 438–440, 442, 468

[56] References Cited

U.S. PATENT DOCUMENTS

| | | |
|---|---|---|
| 4,340,783 | 7/1982 | Sugiyama et al. . |
| 4,602,340 | 7/1986 | Appelberg . |
| 4,805,211 | 2/1989 | Brennan et al. ......................... 379/355 |
| 4,905,273 | 2/1990 | Gordon et al. . |
| 4,935,954 | 6/1990 | Thompson et al. ......................... 379/94 |
| 4,994,926 | 2/1991 | Gordon et al. ......................... 358/400 |
| 5,262,860 | 11/1993 | Fitzpatrick et al. . |
| 5,369,689 | 11/1994 | Kawamura ......................... 379/100 |

FOREIGN PATENT DOCUMENTS 2211698  7/1989  United Kingdom .

*Primary Examiner*—Wing F. Chan
*Attorney, Agent, or Firm*—Christie, Parker & Hale, LLP

[57] ABSTRACT

The information distribution system is a self-contained automatic interface unit for connecting an information receiver such as a FAX machine to an information and retrieval system on a predetermined schedule to obtain a predetermined set of information selected by the user. Programming of the interface unit by the user allows selection of schedule and information desired from an updated database source such as a stock quotation reporting system. Alteration of the selected times and desired information by the user through reprogramming of the interface unit allows the user to obtain only the desired information and allows autonomous operation of the information distribution system. Connection of broadcast receiver system having a controller and an information recording control allows access to additional information from broadcast programs. Activation of the control stores time, date and station information which is translated to a predetermined command for information which is transmitted through an interface to the automatic interface unit.

2 Claims, 6 Drawing Sheets

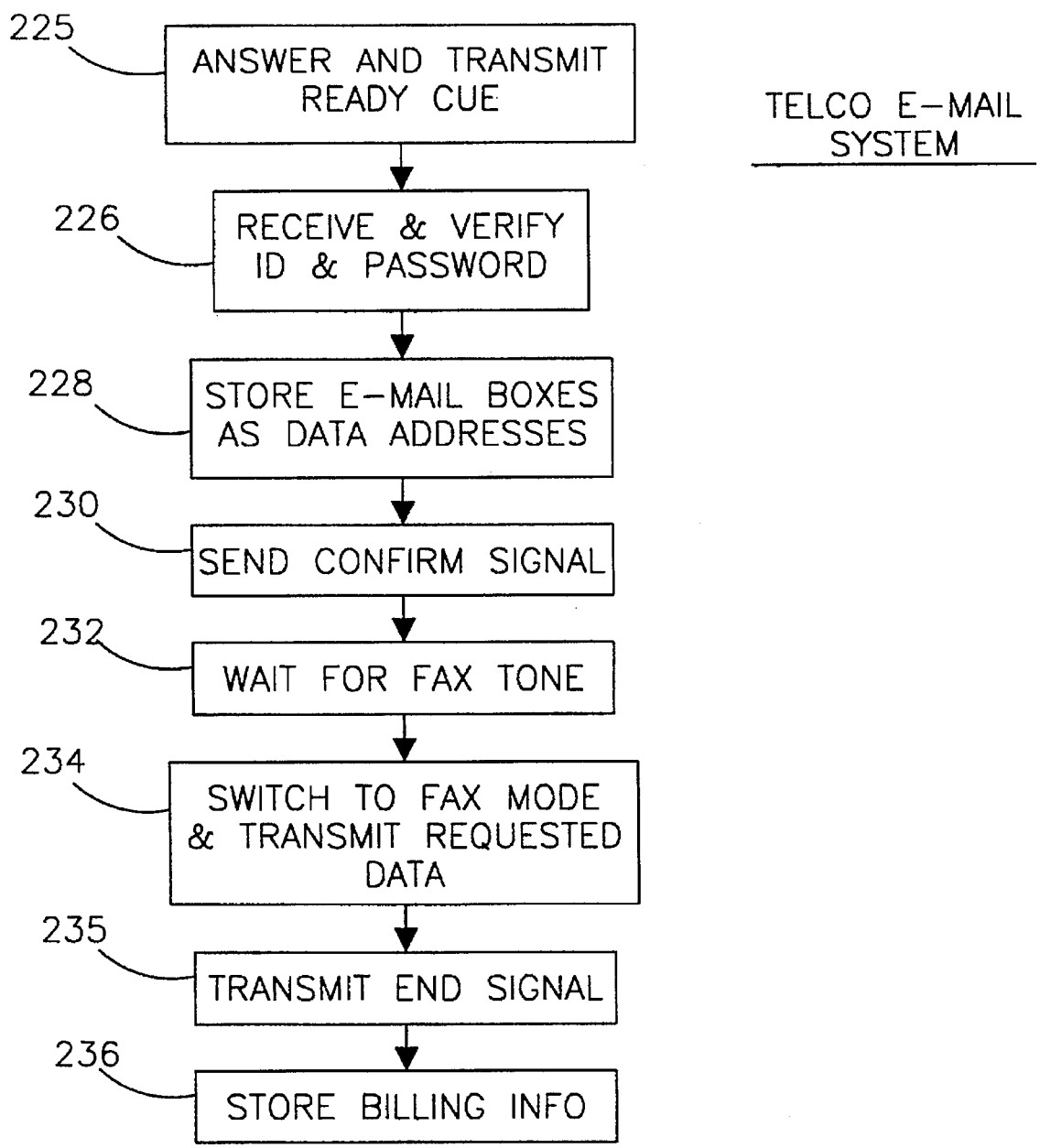

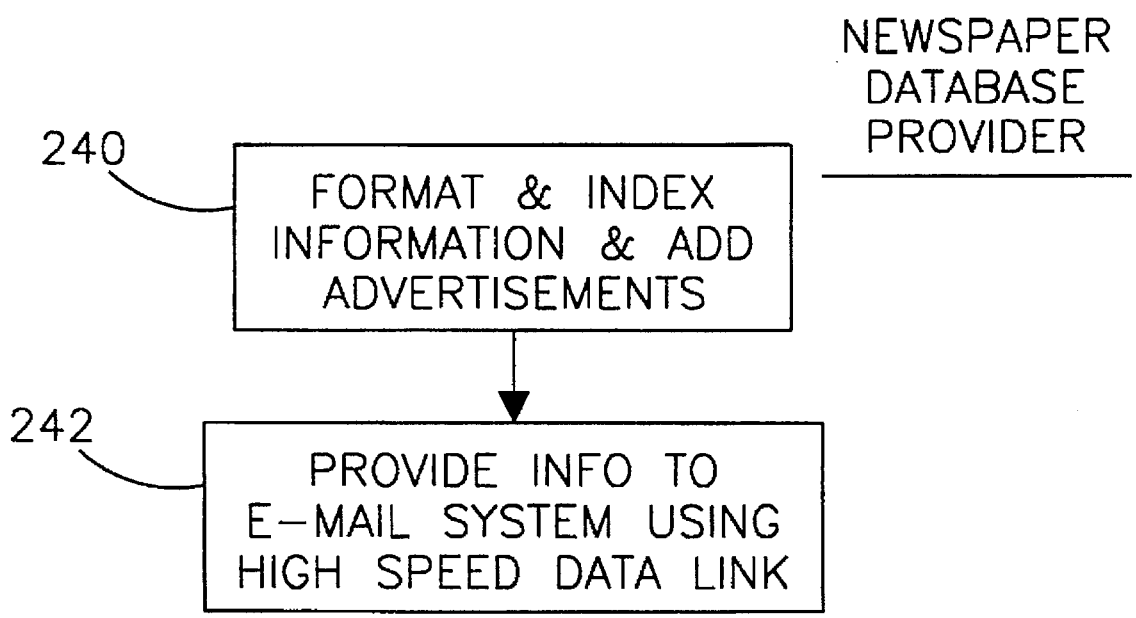

INFORMATION DISTRIBUTION SYSTEM

BACKGROUND OF THE INVENTION

1. Field of the Invention

The present invention relates generally to the field of distribution of updated database information to individual users or subscribers upon user request. More particularly, the invention provides a self-contained automatic interface unit for connecting an information receiver to an information and retrieval system on a predetermined schedule to obtain a predetermined set of information selected by the user. The interface unit is reprogrammable to allow alteration of the selected times and desired information and provides control capability for interfacing an information and retrieval system and information receiver, both of which require call in connection. The invention additionally provides a computer monitored radio receiver for identifying data selections offered by broadcasts received and forwarding such identification to the interface unit as desired information to be obtained from the information and retrieval system.

2. Prior Art

Delivery of current database information to individual requestors or subscribers has become a growing industry, particularly, in the field of financial information, stock quotations, commodities quotations and other rapidly changing data. The updated data are provided to users through numerous formats and equipment structures.

Electronic mail systems allow direct communication between personal computers for transfer of information between users, and voice messaging systems allow unattended call-in by interested subscribers to receive audible updates of various information.

Certain information systems allow a subscriber to dial in to an "E-mail" system, select information which is desired using the key pad of the telephone and transfer the call to a FAX machine to receive the data in hard copy format. These systems require direct user interaction to initiate the call, select the information desired and accomplish the transfer of the call to the FAX machine for transfer.

In commercial use, systems are offered wherein the user dials in to the information service, uses extension numbers or menu selections, provided verbally by the service, to select the desired information and then receives the information verbally from the system. An issue which arises with this type of information transfer is cost effective billing for the service by the provider. In some instances, advertisements are interspersed in the data to provide indirect income for the supplier, while the user is only directly charged for the local telephone call.

Alternate systems employ a "900 number" providing direct payment to the service provider for the service through telephone billings. These systems are simple in operation, however, the user must remain on the telephone to receive the information verbally, thereby preventing implementation of an unattended data recovery system.

Conventional telephone FAX services are available for subscribers paying a monthly fee. This service typically requires the user to presubscribe and to predesignate data selections. The equipment of the service provider then dials out to each subscriber's FAX machine transmitting data corresponding to the designated data selections at an interval determined by the service. Subscription fees for these services are relatively expensive and the service provider incurs substantial telephone charges which must be amortized in the subscription costs. This system provides unattended operation and employs current facsimile equipment. Designation of new data selections requires extensive administrative changes by both the subscriber and the service, and frequency of data distribution is often not customized to the subscriber or, if customized, requires the previously described administrative steps for altering the frequency of delivery.

Standard computer database services are offered by numerous companies wherein users presubscribe for a monthly fee to allow access to the database and, in addition, in some services, pay an on-line charge based on time spent in accessing the service. Typically, these systems require a personal computer and are not amenable to unattended operation since the systems are directly interactive with the user for choices of data desired, storage and/or printing of the selected data, and general log-on/log-off procedures. Telephone charges are borne by the user in these system implementations.

Standard telephone E-mail systems are provided by major telephone companies allowing computer users to communicate with other users by data storage in preassigned E-mail boxes. This data can then be accessed by third parties with a special key code or may be automatically broadcast to several designated mail boxes. Generally, a monthly fee is required as well as a transaction fee from the subscriber to the service. These systems require a computer interface and do not interact directly with FAX machines. Operation of these systems, from the user standpoint, is not easily automated for unattended operation.

Alternate services in the E-mail systems allow users to call in for FAXES which have been stored in their E-mail box for transmission to a FAX machine. This system requires user interaction to establish the transfer and does not allow any selection of various information to be received.

FAX information systems for mail order catalogs and other information services have been established to provide additional product data or information to a potential buyer. The catalog includes an "800 number" and limited product information. Contained within each product advertisement is an extension number for additional information by facsimile. The reader is instructed to call the 800 number, enter his FAX number, along with the extension number and hang-up. The catalog company then dials the reader's FAX machine and FAXES the requested information. This system is expensive and cumbersome requiring two telephone calls per request and requires that the service provider carry the cost of at least one of the telephone calls or both calls if an 800 number is used. This information system is not amenable to unattended operation and is not easily adaptable to timed distribution of updated information.

The final prior-art system presently available incorporates a radio broadcast system for updating information. The interface unit requires an RF receiver and substantial random access memory, or other storage capability, to receive the broadcast updates. Advantages of the system are that the variable cost per message delivery to the information provider is essentially zero. Further, the system can be operated by the information receiver in an unattended mode, however, selection of information requested in not possible. The entire RF broadcast is received as transmitted. Consequently, selection must be accomplished from the data stored at the user interface leading to the large memory/storage requirements.

In addition to printed data provided through distribution systems such as those disclosed above, supplemental information is often available for television or radio broadcast programming. This information may be as simple as the name and title of the song or program being played or may constitute reprints, expansions or bibliographies of associated information or advertising information. No satisfactory system is presently available for automated retrieval of such information.

The present invention alleviates the shortcomings of the prior-art devices by providing a system which will operate unattended and may be used with currently available facsimile equipment.

SUMMARY OF THE INVENTION

The information distribution systems of the present invention incorporates an automatic self-contained interface unit for unattended control and connection of an information and retrieval system to an information receiver. The interface unit incorporates the capability for connecting an information receiver in the form of a FAX machine or other receiver only type data terminal to a telephone line. The interface unit is capable of making outgoing communications for control of the information and retrieval system and the information receiver, while incorporating a receiving system for receiving signals from both systems on the telephone line. A hold circuit is provided in the interface unit for placing the telephone line on hold during interactive communications with one system element.

A controller integral to the interface unit provides for unattended operation of the system by activating the connection of the telephone line at a predetermined time, and upon response from the information and retrieval system, issuing a set of predetermined commands for retrieving the desired information. Upon receiving a proper cue from the information and retrieval system, the controller places the telephone line on hold and provides commands to the information receiver to prepare the receiver for information to be transmitted over the telephone line. Upon receiving a confirmation of the readiness of the information receiver, the controller takes the line off hold, connecting the information and retrieval system and the information receiver.

The information and retrieval system of the data distribution system incorporates a computerized data distribution system, which receives updated information to be selectively transmitted to subscribers. The computer sorts and formats the data and provides data to specific FAX mail boxes in an E-mail system, which incorporates control capability for accessing of multiple selected mail boxes in a single communication for downloading of the FAX transmissions stored in the mail boxes. Selection of the mail boxes to be downloaded is accomplished by the predetermined commands from the interface unit.

A password identification system and other data protection is incorporated in the E-mail system to allow access only by authorized subscribers.

In operation, the interface unit may be programmed by a subscriber to initiate contact with the information and retrieval system at a desired frequency, i.e., once, daily, weekly or other user-selected interval, and information selection is accomplished by designation of the mailboxes to be addressed in the contact. Further interaction by the subscriber with the system is unnecessary until changes are desired in the frequency of access or the information types desired.

The invention further includes a radio receiver system with a controller to store time, date and station (TDS) information upon activation of a push button or other control by the subscriber in response to program information heard by the subscriber on the radio. The radio receiver system controller transmits the TDS data to the interface unit which employs the TDS data or a conversion thereof as a mailbox identification for retrieval of information associated with the program provided to the E-mail system by the broadcaster of the program.

BRIEF DESCRIPTION OF THE DRAWINGS

The present invention will be better understood in reference to the following drawings, and detailed description wherein:

FIG. 2b is a flow chart of operations performed by the E-mail system incorporated as a portion of the information and retrieval system;

FIG. 2c is a flow chart of the operations performed by the data distribution computer in the information and retrieval system;

DETAILED DESCRIPTION

Figure 1:
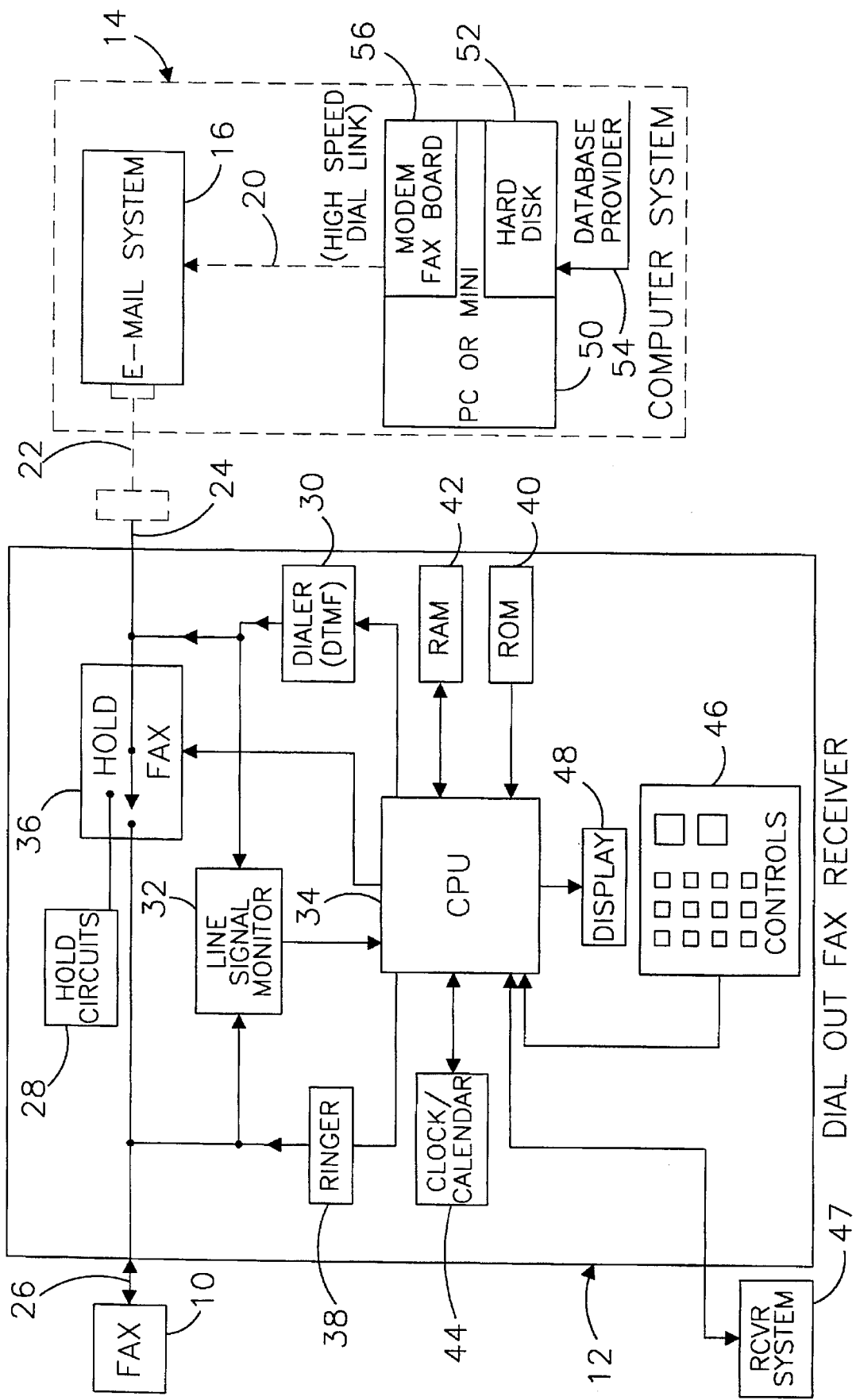
FIG. 1 is a block diagram schematic of the interface unit and general configuration of the information and retrieval system for connection to an information receiver.

An embodiment of the present invention adapted for use with a standard facsimile machine to take advantage of the invention's capability for use with preexisting equipment is shown in the drawings. Referring to FIG. 1, the information distribution system comprises an information receiver in the form of a FAX machine 10, an interface unit 12, and an information and retrieval system generally designated 14 which comprises an E-mail system 16, and a computer data distribution system 18 interconnected by a high-speed data link 20. The interface unit is set up for connection to a standard telephone line 22 in the public switched network.

The interface unit is connected to the public switched network through a standard phone jack connection 24 and to the facsimile machine through the phone jack interface 26. The interface unit incorporates a dialer circuit 30, which uses standard dual-tone multi-frequency (DTMF) codes for dialing out with a desired telephone number. The dialer circuit includes the capability for simulating "hook flash" for call initiation and termination signaling. A line signal monitor 32 receives signals transmitted over the connected telephone line which are then provided to a central processing unit (CPU) 34.

A controllable switch 36 is included in the line circuit to allow the line to be placed on hold using hold circuits 28 well known in the art. The normal position for this switch is the FAX position, whereby the FAX machine 10 is connected to the telephone line 22. A ringer circuit 38, also well known in the art, is connected for transmission of a ring signal to the information receiver 10.

The controllable switch, dialer circuit and ring circuit operate responsive to commands from the CPU. A read only memory (ROM) 40 and a random access memory (RAM) 42 are incorporated in the interface unit for instruction and data storage, respectively, for use by the CPU. A clock/calendar circuit 44 provides current time and date information to the CPU for timing purposes.

An input system incorporating a keyboard 46 is employed for data entry to the CPU. A display 48 is provided for display of the data input and prompt commands provided by the CPU for the data input. In the embodiment shown, the CPU is preprogrammed employing the ROM for prompting the input of predetermined command sequences to be described in greater detail subsequently. Those skilled in the art will recognize that an RS232 interface or other similar communications port could be employed in alternate embodiments to allow direct communication by the interface unit with a personal computer which acts as the input system and display for the CPU.

In operation, the interface unit provides interaction with the information and retrieval system and information receiver which cannot be accomplished by those units individually. Operation of the system is outlined in flow-diagram form in FIGS. 2a and 2b. The user receives from the service provider a catalog or other communication which provides a directory listing which may include a local phone number or a 900 number for access to the E-mail system. A list of extension numbers which correspond to index codes or designator identifying the various data available on the system is provided for a wide range of topics. This list can be periodically updated and expanded and is limited only by the number of E-mail box locations available.

The user prestores in the interface unit the phone number for E-mail system comprising the interface for the information and retrieval system, an identification code or security code allowing access to the system, and the mail box numbers or data designator for the desired information to allow selective collection of that information. A time for reception and frequency of reception are entered. These steps are identified as block 200 in FIG. 2a.

The CPU in the interface unit then monitors the time and calendar circuit and when the selected time has been reached for system operation, block 202, the system determines if the facsimile machine comprising the information receiver is busy, block 204. This is accomplished in various embodiments by monitoring the FAX line directly employing the line signal monitor or, alternatively, through the CPU issuing a ring command to the ringer circuit which is issued to the FAX machine resulting in a busy signal received by the line signal monitor and returned to the CPU. If the information receiver is busy, the CPU sets an internal timer to determine a redial interval, block 206. Upon expiration of the timer the information receiver is again polled to determine its availability.

After confirmation of the availability of the information receiver, the CPU provides data corresponding to the information and retrieval system telephone number to the dialer circuit which issues standard DTMF output for the telephone number, block 208. The public switched network completes the call to the information and retrieval system, which upon answer issues a ready cue, block 225 of FIG. 2b. If the information and retrieval system has all lines busy, the line signal monitor transmits the busy signal to the CPU, block 210, which sets the dial timer for later call back.

The line signal monitor 32 transmits the ready cue to the CPU which then outputs a data string corresponding to a security access code and designator identifying various data desired from the information and retrieval system. This data string is transmitted through the dialer circuit using standard DTMF signaling, block 212 of FIG. 2a. Upon confirmation of the security code and acceptance of the designator for desired data, block 226 of FIG. 2b, the information and retrieval system stores the designator for the data as E-mail box data addresses, block 228, and issues a confirmation signal, block 230, which is received by the line signal monitor and transmitted to the CPU, block 214 of FIG. 2a.

Upon receiving the confirmation signal, the CPU activates the controllable switch 36 placing the telephone line circuit on hold, block 216. The ringer circuit is then activated by the CPU, block 218, issuing a ring tone to the information receiver 10. The facsimile machine, comprising the information receiver in the present embodiment, receives the ring signal and goes off-hook into the receive mode, providing a standard FAX ready tone which is received by the line signal monitor and transmitted to the CPU, block 220. The CPU deactivates the controllable switch 36, taking the telephone line off hold, block 222, thereby allowing direct communication between the information receiver and information and retrieval system which continue the communication through standard dialogue protocols for facsimile transmission, block 223 and block 234. Upon completion of the transmission of data from the information and retrieval system to the information receiver, a standard end-of-message signal is provided by the information and retrieval system, block 235, causing the FAX to disconnect.

Accuracy of the clock/calendar 44 is maintained by communication through the CPU from a high accuracy clock/calendar system (not shown) maintained in the E-mail system. Communication by the E-mail system is accomplished using DTMF code or other communications protocol recognizable by the line signal monitor 32. Maintaining a high accuracy clock in the information and retrieval system which is accessed by all information receivers provides consistent timing among receiver stations.

The CPU monitors the clock/calendar for the next program retrieval time at which time the above described sequence is repeated.

Upon completion of the data transfer, the information and retrieval system stores billing information corresponding to the data extracted by the interface unit and information receiver, block 236 of FIG. 2b. As previously described, the present system allows for great flexibility on the part of the service provider in determining billing approaches for the service. All call expenses may be borne by the user since the system involves only call-in communications. If, as a portion of the subscription service, it is desired to provide an 800 number for the service, this can be accomplished to allow the provider to bear a portion of the cost. In the alternative, if the provider desires additional billing capability, a 900 number may be employed for direct profit to the provider based on connection time. Billing information stored by the E-mail system, based on the number of mail boxes accessed, may then be employed by the service provider for billing the user based on quantity of data received.

The computer data distribution system 18, comprising the second element of the information and retrieval system in the embodiment in the drawings, is a PC or mini computer 50 with data storage capability in the form of a hard disk 52 or other mass storage data device. The database provider inputs data for the various designated service information into the data distribution system through an interface 54. This interface may comprise a direct input or, in certain embodiments, comprises a download interface from a mainframe computer system operated by the provider for generation and storage of the database information. The information downloaded to the data distribution system is sorted and assigned to various E-mail boxes in the E-mail system. The updated data for each E-mail box is then converted to a facsimile format employing a modem FAX board 56. The data distribution system then communicates directly with the E-mail system over the high-speed data link downloading the FAX format information into the E-mail boxes for distribution to the users upon call-in. Flexibility in control programming of the data distribution system allows update of individual mail boxes or mass update of numerous mail boxes as new data arrives from the data base provider.

Figure 3:
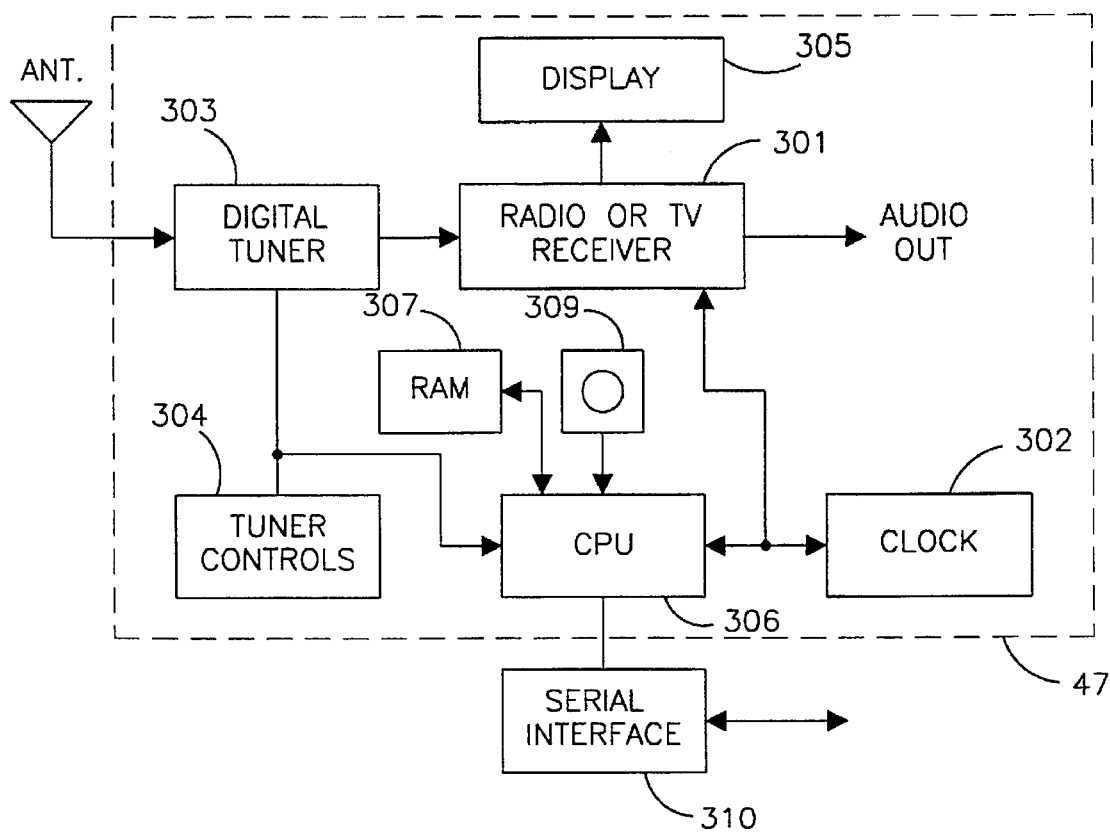
FIG. 3 is a schematic block diagram of the radio receiver and control computer system.

FIG. 3 is a block diagram illustrating schematically an additional element for a radio receiver incorporated in the embodiment of the invention shown in the drawings. The radio receiver system 47 is a modification of a common radio or television. The system comprises a radio receiver circuit 301, a digital tuner 303 and a tuner control circuit 304 all of which can be found in standard radio or television sets. As in many common units, the radio receiver system 47 may have a clock 302. If a clock is not present, one can be built easily. Preferably, the clock 302 measures and indicates date in addition to hour, minute and second.

In accordance with the present invention, the receiver system 47 has a CPU 306 coupled to the digital tuner 304 and the clock 302. A random access memory (RAM) 307 is connected to the CPU for data storage.

The CPU 306 is activated when a "BROADCAST INFO" key 309 is actuated. When activated, the CPU 306 operates to store an identification of the tuned station (e.g. its frequency from the digital tuner 304) to the memory 307, along with the value of the clock 302 at the time the key 309 is actuated.

In the embodiment shown in the drawings, the CPU 306 employs a serial interface 310 for communication with the CPU 34 in the interface unit which comprises the dial out fax receiver 12. Alternative communication means such as infrared interfaces or manual interfaces employing a non-volatile memory chip such as that disclosed in related application Ser. No. 07/901335.

The clock 302 in the radio receiver system is updated for consistency with the clock/calendar 44 of the interface unit by communication between CPU 306 and CPU 34 in the interface unit. As previously described, the clock/calendar 44 of the interface unit is updated during communications with the E-mail system to maintain high accuracy in the clock system.

Figure 2A:
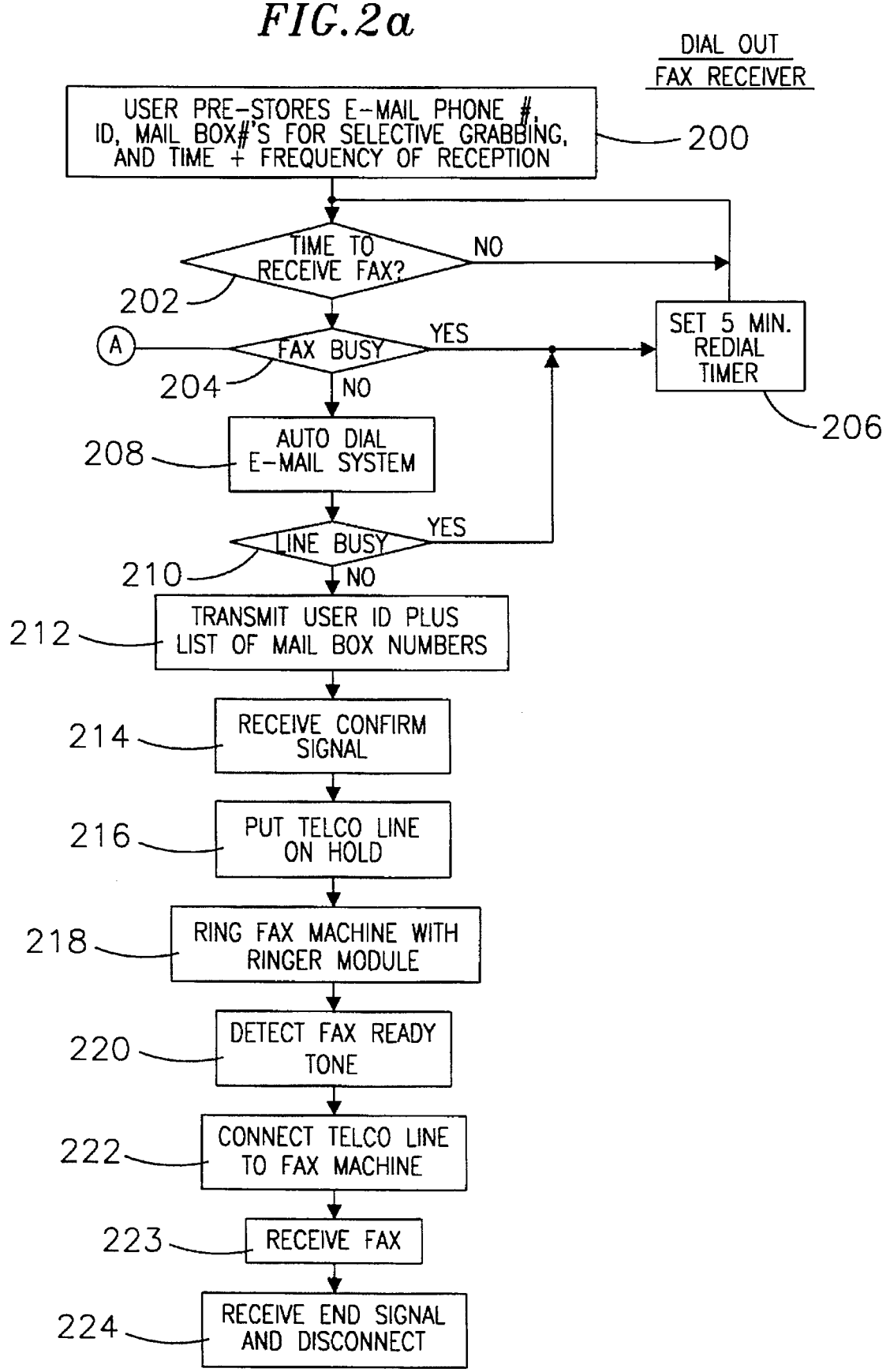
FIG. 2a is a flow chart of operations performed by the controller of the interface unit in initiating the telephone call and interconnecting the information and retrieval system to the information receiver.
Figure 2D:
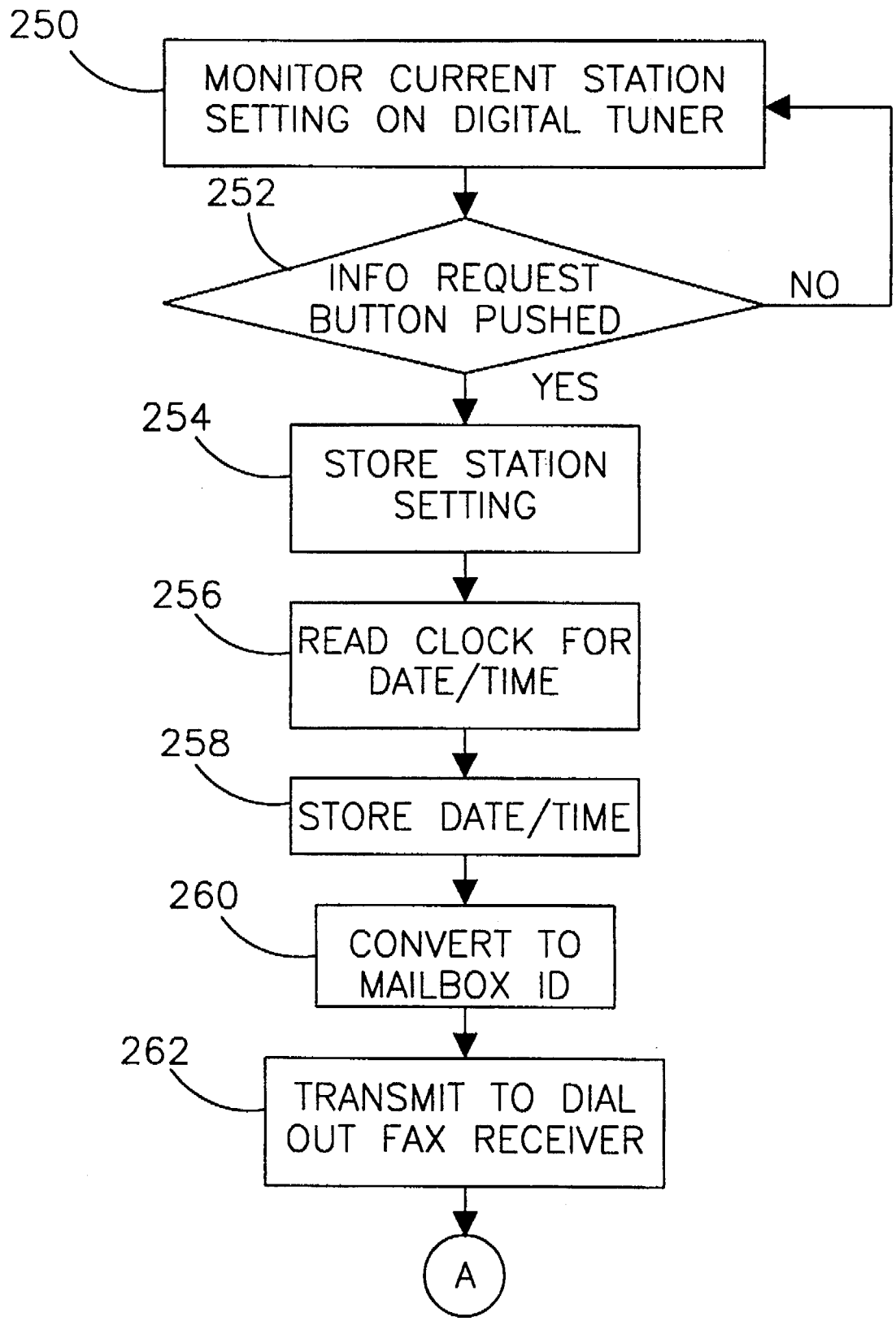
FIG. 2d is a flow chart of the operations performed by the radio receiver control computer for storing time station and day (TDS) data for transfer to the interface unit.

Operation of software in the CPU 306 is shown in FIG. 2d. The CPU monitors the digital tuner for current station setting, block 250. When the "BROADCAST INFO" key is depressed, block 252, the CPU stores the station setting in the RAM, block 254, reads the date and time information from the clock, block 256, and stores the date and time in the RAM, block 258. This stored time, date and station (TDS) data provides a unique identifier for the information which the user desires. The CPU in the embodiment shown in the drawings converts the TDS data to a Mailbox ID compatible with the Auto Dial E-Mail system, block 260, and transmits the data to the CPU 34 in the Dial out fax receiver, block 262, for addition to the list of mailbox numbers from which data will be obtained.

Referring to FIG. 2a, the transmission of data from the CPU 306 results in processing in the interface unit from entry point A. In alternative embodiments for the software of the invention, entry point A is associated with block 202 and retrieval of data associated with the broadcast information is delayed until the normal time cycle for activation of the dial out fax receiver.

In a fully integrated embodiment of the invention wherein the radio receiver is manufactured as a portion of the interface unit, the functions of CPU 34 and CPU 306 are combined in a single CPU. Similarly, clock/calendar 44 and clock 302 as well as RAM 42 and RAM 307 and display 48 and display 305 are combined in single functional elements.

Broadcasters offering program data (names and titles etc.) or supplemental information to broadcast programming, provide data to the computer data distribution system 18 directly or indirectly through the data base provider. Data is then provided to the subscriber through the information and retrieval system as previously described.

A primary use for the invention incorporating the radio receiver system is for obtaining coupons offered in advertisements which are broadcast. Recorded TDS information corresponding to a commercial presented as a portion of a broadcast is then employed by the interface unit to allow downloading of coupons to the fax receiver from the E-mail system. Such downloaded coupons may include barcoded information concerning the coupons and achieve substantially identical usefulness to printed coupons obtained from newspapers, magazines or other sources.

An embodiment of the present invention having capabilities particularly useful in the broadcast coupon scenario employs a non-volatile memory chip such as that previously described with regard to related applications Ser. No. 07/901,735 and shown in detail in FIG. 4. The non-volatile memory chip is employed as an alternative to a serial data interface or other connection between the radio receiver system and the interface unit. A connector 402, which in the embodiment shown comprises a standard multi-pin socket or blade connector, removably attaches the non-volatile memory chip to the CPU 306 of the radio receiver system. Incorporated on the chip is a non-volatile random access memory 404 for data storage. A separate clock 406 is optionally provided on the chip for updating time and date information, as will be described in greater detail subsequently. A battery 408 for providing power to the clock and/or as necessary for powering the non-volatile RAM is also provided.

In operation, when a broadcast item is heard by the subscriber for which additional information is desired, the broadcast info key 309 is pressed resulting in data storage by the CPU in RAM. If the non-volatile memory connected at the time of activation of the broadcast info key or subsequently upon connection of the non-volatile memory chip to the connector, the CPU downloads the TDS information into the non-volatile RAM. The non-volatile memory chip is then disconnected at a convenient time from the radio receiver and attached to a mating connector on the interface unit which replaces or compliments the serial interface shown in FIG. 1. Upon connection of the non-volatile memory chip, the CPU 34 uploads the TDS information from the chip to be added to the set of data to be requested from the E-mail system. Upon uploading of the data, the clock 406 in the non-volatile memory chip is updated by the CPU 34 to correspond to the clock/calendar 44 in the interface unit. Upon reconnection of the non-volatile memory chip to the radio receiver system, CPU 306 interrogates the clock 406 and updates the clock 302 in FIG. 3, thereby, maintaining accuracy of the radio receiver system clock. As will be appreciated, the accuracy of the radio receiver clock must be maintained to allow accurate TDS data particularly for recording of commercials and other information of short duration used in obtaining coupons through the E-mail system.

Figure 4:
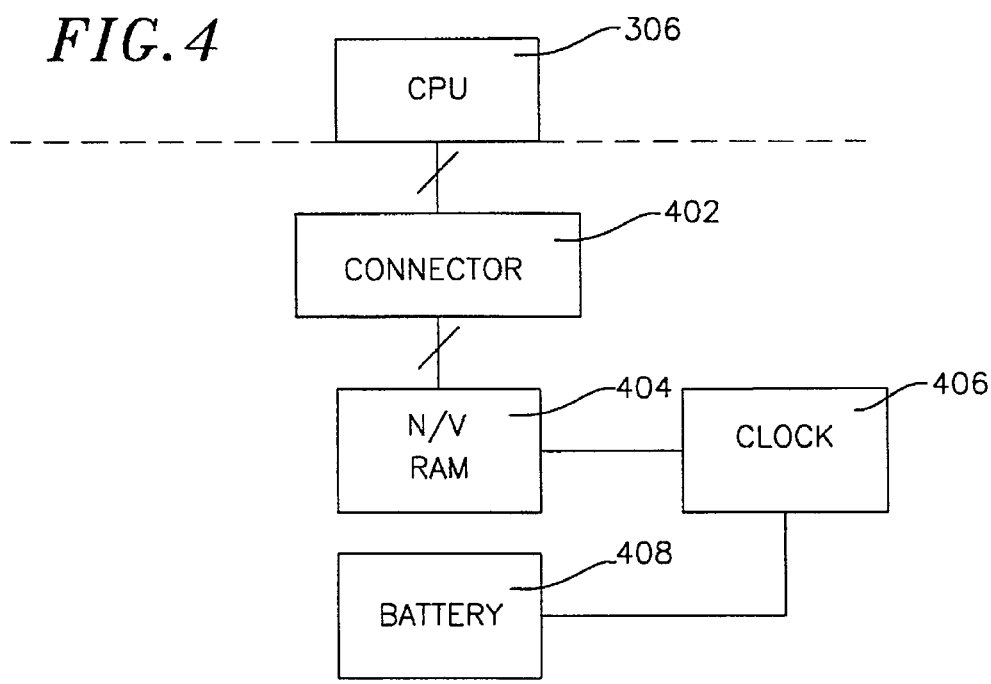
FIG. 4 is a schematic block diagram of an embodiment for a non-volatile memory interface between the radio receiver system and the interface unit.

To avoid reuse of TDS information corresponding to single use coupons, the interface unit CPU 34 upon uploading TDS data from RAM 307 in the embodiment of the invention shown in FIG. 3 or nonvolatile RAM 404 in the embodiment shown in FIG. 4, erases the TDS data from the memory directly or through CPU 306. If the nonvolatile memory chip is in use, upon reconnection of the chip to the radio receiver system, CPU 306 detects the erased memory condition of the nonvolatile RAM 404 and erases corresponding data from RAM 307.

Having now described the invention in detail as required by the patent statute, those skilled in the art will recognize modifications and substitutions in the embodiments disclosed herein. Such modifications and substitutions are within the scope and intent of the present invention as defined by the following claims.

What is claimed is:

1. An automatic self contained interface unit for unattended control and connection of an information and retrieval system to an information receiver comprising:

means for connecting a telephone line to the information receiver;

means for receiving telephonic signals from the connected telephone line;

means for transmitting telephonic signaling tones on the connected telephone line;

means for placing the connected telephone line on hold;

a controller connected to the connecting means, receiving means, transmitting means and hold means, said controller including:

means for activating the controller at a predetermined time;

means for transferring a predetermined set of commands to the transmitting means for transmission as signaling tones for dialing the information and retrieval means on the telephone line and, upon answer, an information data string to the information and retrieval system for defining selective collection and transmission of specific information;

means for interactively interpreting signals received by the receiving means;

means responsive to a first signal from the interpreting means for activating the hold means;

means for transferring a command to the transmitting means for transmission to the information receiver; and means responsive to a second signal from the interpreting means for deactivating the hold means thereby interconnecting the information receiver with the information and retrieval system;

a broadcast receiver having a controllable station tuner;

means for selecting the station to which the tuner is set;

a clock for designating current date and current time;

manual input means for issuing a store command;

a memory;

a second controller responsive to the selecting means, the clock, and the manual input means for storing in the memory data representative of the station to which the tuner is set, the current date, and the current time when a store command is issued; and means for interfacing the second controller to the controller whereby station date and time data are stored as a portion of the predetermined set of commands.

2. A method for connecting an information and retrieval system to an information receiver employing an interface unit having telephone signal receiving capability and signaling tone transmission capability, the interface unit including a system for inputting selected predetermined commands for the information and retrieval system, the input system including a broadcast receiver, said method comprising the steps of:

selecting information desired from the information and retrieval system, said selecting step including the steps of:

tuning the broadcast receiver to a station;

activating a control input when additional information regarding the broadcast on the station is desired;

storing time, date and station information;

translating the time, date and station information into a predetermined set of commands;

and transfer the predetermined command to the interface unit;

entering commands on the input system corresponding to the information desired;

entering a predetermined time for activation of the interface unit;

initiating operation of the interface unit;

activating the interface unit at a predetermined time;

determining if the information receiver is busy;

resetting the predetermined time for activation if the receiver is busy;

deactivating the interface unit until the new predetermined time;

dialing a predetermined number for the information and retrieval system;

transmitting the predetermined set of commands to the information and retrieval system for defining selective collection of information to be retrieved;

receiving an activation cue from the information and retrieval system;

placing the telephone line on hold;

ringing the information receiver;

receiving a confirmation tone from the information receiver; and taking the telephone line off hold to allow communication between the information retrieval system and the information receiver.

\* \* \* \* \*